(12) United States Patent
Weaver

(10) Patent No.: US 7,711,733 B2
(45) Date of Patent: May 4, 2010

(54) METHODS, SYSTEMS, AND PRODUCTS FOR TARGETING MEDIA FOR STORAGE TO COMMUNICATIONS DEVICES

(75) Inventor: Timothy H. Weaver, Alpharetta, GA (US)

(73) Assignee: AT&T Intellectual Property I,L.P., Reno, NV (US)

( * ) Notice: Subject to any disclaimer, the term of this patent is extended or adjusted under 35 U.S.C. 154(b) by 263 days.

(21) Appl. No.: 11/703,325

(22) Filed: Feb. 7, 2007

(65) Prior Publication Data
US 2008/0189329 A1    Aug. 7, 2008

(51) Int. Cl.
G06F 7/00 (2006.01)
G06F 17/30 (2006.01)

(52) U.S. Cl. .................... 707/732; 707/784

(58) Field of Classification Search .............. None
See application file for complete search history.

(56) References Cited

U.S. PATENT DOCUMENTS

| | | | |
|---|---|---|---|
| 4,903,130 A | 2/1990 | Kitagawa et al. | |
| 5,255,180 A | 10/1993 | Shinoda et al. | |
| 5,313,282 A | 5/1994 | Hayashi | |
| 5,331,354 A | 7/1994 | Koyama et al. | |
| 5,652,615 A | 7/1997 | Bryant et al. | |
| 5,731,764 A | 3/1998 | Tanaka | |
| 5,774,170 A | 6/1998 | Hite | |
| 6,006,257 A | 12/1999 | Slezak | |
| 6,009,409 A | 12/1999 | Adler et al. | |
| 6,078,589 A | 6/2000 | Kuechler | |
| 6,094,681 A * | 7/2000 | Shaffer et al. ............. 709/224 |
| 6,237,022 B1 | 5/2001 | Bruck | |
| 6,252,588 B1 | 6/2001 | Dawson | |
| 6,307,550 B1 | 10/2001 | Chen | |
| 6,317,165 B1 | 11/2001 | Balram | |
| 6,324,182 B1 | 11/2001 | Burns | |
| 6,345,293 B1 | 2/2002 | Chaddha | |
| 6,446,261 B1 | 9/2002 | Rosser | |
| 6,460,075 B2 | 10/2002 | Krueger | |
| 6,591,423 B1 | 7/2003 | Campbell | |
| 6,647,411 B2 | 11/2003 | Towell | |
| 6,698,020 B1 | 2/2004 | Zigmond et al. | |
| 6,757,796 B1 | 6/2004 | Hofmann | |
| 6,771,644 B1 | 8/2004 | Brassil et al. | |
| 6,791,622 B2 | 9/2004 | Zeidler | |
| 6,870,463 B2 | 3/2005 | Dresti et al. | |
| 6,882,793 B1 | 4/2005 | Fu | |
| 6,963,903 B2 | 11/2005 | Krueger | |
| 2002/0028026 A1 | 3/2002 | Chen | |
| 2002/0108127 A1 | 8/2002 | Lew | |
| 2002/0112005 A1 | 8/2002 | Namias | |
| 2002/0120943 A1* | 8/2002 | Seto et al. ................... 725/135 |
| 2002/0133830 A1 | 9/2002 | Kim | |
| 2003/0067554 A1 | 4/2003 | Klarfeld | |
| 2003/0088687 A1 | 5/2003 | Begeja | |
| 2003/0088872 A1* | 5/2003 | Maissel et al. ............... 725/46 |
| 2003/0088878 A1 | 5/2003 | Rogers | |
| 2003/0139134 A1 | 7/2003 | Bailey et al. | |

(Continued)

Primary Examiner—Uyen T. Le
(74) Attorney, Agent, or Firm—Cantor Colburn LLP

(57) ABSTRACT

Methods, devices, and products are provided for targeting media. Descriptive information is received that describes media. The descriptive information is compared to a stored set of user-defined criteria. If the descriptive information contains any criterion, then the media is stored in memory, wherein the stored media is targeted to a user's communications device.

20 Claims, 11 Drawing Sheets

U.S. PATENT DOCUMENTS

| | | |
|---|---|---|
| 2004/0031058 A1 | 2/2004 | Reisman |
| 2004/0078814 A1 | 4/2004 | Allen |
| 2004/0131357 A1 | 7/2004 | Farmer et al. |
| 2004/0210944 A1 | 10/2004 | Brassil et al. |
| 2004/0255336 A1 | 12/2004 | Logan |
| 2004/0268407 A1 | 12/2004 | Sparrell et al. |
| 2004/0268410 A1 | 12/2004 | Barton |
| 2005/0081252 A1 | 4/2005 | Chefalas |
| 2006/0029093 A1 | 2/2006 | Van Rossum |
| 2006/0241859 A1* | 10/2006 | Kimchi et al. ............... 701/208 |
| 2007/0239522 A1* | 10/2007 | Kunz et al. .................. 705/14 |
| 2008/0147650 A1* | 6/2008 | Marsh ........................... 707/5 |

* cited by examiner

METHODS, SYSTEMS, AND PRODUCTS FOR TARGETING MEDIA FOR STORAGE TO COMMUNICATIONS DEVICES

CROSS-REFERENCE TO RELATED APPLICATIONS

This application relates to the following co-pending and commonly-assigned applications, with each application incorporated herein by reference: U.S. application Ser. No. 11/300,125, filed Dec. 14, 2005 and entitled "Presence Detection in a Bandwidth Management System"; U.S. application Ser. No. 11/300,061, filed Dec. 14, 2005 and entitled "Methods, Systems, and Devices for Bandwidth Conservation"; U.S. application Ser. No. 11/178,075, filed Jul. 8, 2005 and entitled "Methods, Systems, and Devices for Securing Content"; U.S. application Ser. No. 11/304,264, filed Dec. 14, 2005 and entitled "Methods, Systems, and Computer Program Products For Providing Traffic Control Services"; U.S. application Ser. No. 11/703,573, concurrently filed and entitled "Methods, Systems, and Products for Conserving Bandwidth"; U.S. application Ser. No. 11/703,352, concurrently filed and entitled "Methods and Systems for Image Processing"; U.S. application Ser. No. 11/703,359, concurrently filed and entitled "Methods, Systems, and Products for Recording Media"; U.S. application Ser. No. 11/703,574, concurrently filed and entitled "Methods, Systems, and Products for Recording Media"; and U.S. application Ser. No. 11/703,565, concurrently filed and entitled "Methods, Systems, and Products for Restoring Media".

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to targeting media (such as movies, music, and advertisements) to users.

Advertising is undergoing profound change. Recent technological advancements permit users to "skip" commercials and other targeted media. Video recorders, for example, include technologies to detect and skip commercials. Additionally, users habitually "surf" during commercials breaks, further eroding advertising effectiveness. The entertainment industry's traditional advertising-based model, then, is threatened by technological change. Targeted advertising has thus emerged to customize commercials to user interests, profiles, demographics, and location. These targeted advertisements seek to capture the user's interests and present relevant messages that appeal to the user.

Today's targeted advertisements, however, rely on personal or even private information. A profile is constructed for a user or household, and advertisements are targeted to that profile. The problem with such efforts, however, is that personal or even private information may be revealed or captured. Users often have no control over what information is gathered to build their profile. So, while many people are concerned about maintaining the privacy of personal information, today's current targeted advertising techniques strive to gather as much information as possible. What is needed, then, are methods, systems, and products that target advertising and other media without revealing personal or private information.

SUMMARY

The aforementioned problems, and other problems, are reduced, according to exemplary embodiments, by methods, systems, and products that target media to users. These exemplary embodiments describe a paradigm shift in the advertising-based model used by the entertainment industry. Here media is targeted to a user based on user-defined criteria, such as keywords, properties, instructions, and/or graphics. The user, for example, may establish a set of criteria that describe subject matter of interest to the user. As media is received by the user's communications device, that media is compared to the user's set of criteria. If the media contains any visual or audible content that matches the user's set of criteria, the media may then appeal to the user interests. The media is saved to memory for retrieval and enjoyment. Additional embodiments may calculate a score that reflects how well the media correlates to the keywords, properties, instructions, and/or other criteria. If, however, the media does not match the set of criteria, or if the resulting score is less than a threshold score, then the media may be discarded, presumedly not being of interest to the user. Here, then, the paradigm shift in the advertising-based model reflects user-defined criteria (such as words, phrases, properties, and other attributes) that appeal to the user. The user may accurately determine what subject is appealing without revealing personal or private information.

Exemplary embodiments describe a method for targeting media to a user. The term "media" includes any movie, music, advertisement, and/or image. The media may be a stream of data or a file that is packetized according to a packet protocol. The audible and/or visual content of the media is compared to a stored set of user-defined criteria. The set of criteria include words or phrases that appeal to the user. If the content of the media contains any member of the set of criteria, then the media is stored in memory. If, however, the content of the media fails to contain any member of the set of criteria, then the content is discarded. The stored media is thus targeted to a user's communications device.

In another exemplary embodiment, another method is disclosed for targeting advertisements. Descriptive information that describes media is sent to a user's communications device. Information is received that describes comparison matches between the descriptive information and a set of user-defined criteria that are stored in memory of the user's communications device.

More exemplary embodiments describe a device for targeting advertisements. The device comprises a processor communicating with a user interface stored in memory. The processor stores a set of user-defined criteria in the memory, and the processor receives descriptive text and/or other information that describes any media, such as an advertisement. The processor compares the descriptive information to the set of criteria. If the descriptive information contains any member of the set of criteria, then the processor stores the media in the memory. If, however, the descriptive information fails to contain any member of the set of criteria, then the processor discards the media. The stored media is thus targeted to a user's communications device.

Still more exemplary embodiments describe another device for targeting advertisements. A processor communicates with a network interface and with memory. The processor sends descriptive text and/or other information to a user's communications device that describes media. The processor receives information describing comparison matches between the descriptive information and a set of user-defined criteria that are stored in memory of the user's communications device.

Exemplary embodiments also include a computer program product for targeting advertisements and other media. The computer program product stores computer code for storing a set of user-defined criteria. Descriptive information, such as descriptive text, is received that describes media. The descriptive information is compared to the set of user-defined criteria. If the descriptive information contains any member of the set of criteria, then the media is stored in memory. If the descriptive information fails to contain any member of the set of criteria, then the media is discarded. The stored media is thus targeted to a user's communications device.

Other exemplary embodiments include more computer program products. Here descriptive information is sent to a user's communications device that describes an advertisement and/or other media. Information is received that describes comparison matches between the descriptive information and a set of user-defined criteria that are stored in memory of the user's communications device.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Figure 1:
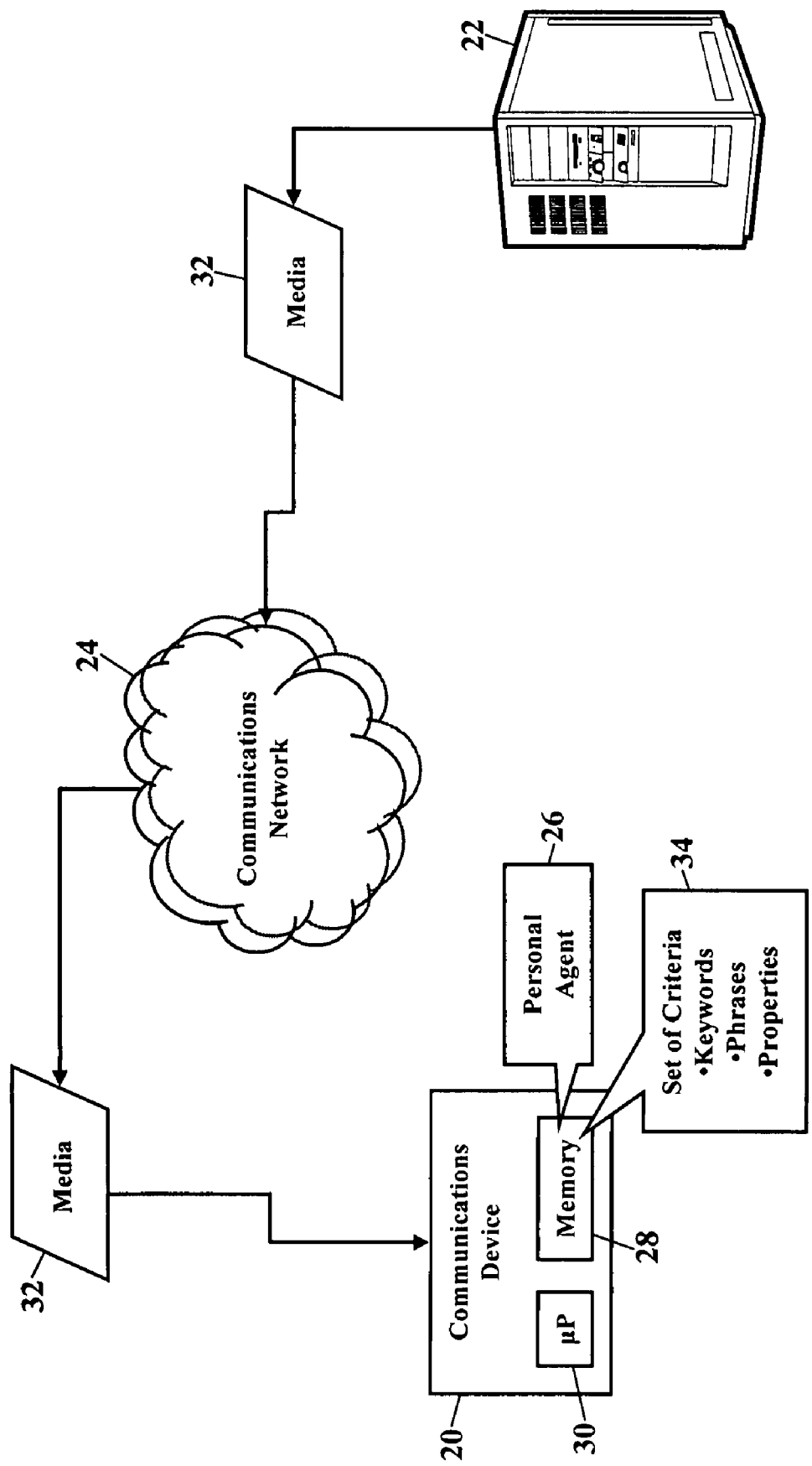
FIG. 1 is a schematic illustrating an operating environment, according to exemplary embodiments.

FIG. 1 is a schematic illustrating an operating environment, according to exemplary embodiments. FIG. 1 illustrates a user's communications device 20 communicating with a media server 22 via a communications network 24. Although the user's communications device 20 is generically shown, as later paragraphs will explain, the communications device 20 may be a computer, set-top box, digital recorder, phone, or any other communications device. The user's communications device 20 stores a personal agent 26 in memory 28. The personal agent 26 includes processor-executable code or instructions that cause a processor 30 (e.g., "µP"), application specific integrated circuit (ASIC), or other similar device to target media to the user. Although the term "user" is used throughout this specification, it should be understood that the personal agent 26 may target media to multiple users. As the following paragraphs will explain, the personal agent 26 compares one or more media streams or files 32 (e.g., movie, music, advertisements, and/or image files) to a set 34 of user-defined criteria stored in the memory 28. According to an exemplary embodiment, the set 34 of criteria includes keywords and/or phrases of interest to the user. (The set 34 of criteria may additionally or alternatively store keywords and phrases that are of interest to multiple users.) If, for example, the user is interested in media related to boating, the user may populate the set 34 of criteria with "boat," "helm," "keel," and other boating/nautical terms. The user may even include boating or nautical themes, such as "harbor," "marina," "islands," "cruising," and even "waterskiing." The personal agent 26 then compares the media 32 to the set 34 of criteria. If the media 32 contains, or is associated with, one or more of the criteria in the set 34 of keywords, then the media 32 is stored in the memory 28. If the media 32 fails to contain any of the criteria, then the personal agent 26 has discretion to store, discard, or ignore the media 32. The personal agent 26, then, targets media based on criteria defined by the user.

The set 34 of criteria may include any descriptive information. The set 34 of criteria, for example, may include graphical/visual symbols, pictures, and audio content. The personal agent 26 compares the media 32 to the set 34 of criteria. If the media 32 contains, or is associated with, one or more of the symbols, pictures, and/or audio content, then the media 32 is stored in the memory 28. If the media 32 fails to contain any of the criteria, then the personal agent 26 has discretion to store, discard, or ignore the media 32. The personal agent 26, then, targets media based on symbols, pictures, and/or audio content selected or defined by the user.

According to additional embodiments, the media 32 may be scored. As the personal agent 26 compares the media 32 to the set 34 of criteria, the personal agent 26 may calculate a score for the media 32. The score may reflect how well the media 32 correlates to the set 34 of criteria. The score, for example, may have a high value if the media 32 contains one or more exact phrases from the set 34 of criteria. If the media 32 only contains a single word match from multiple entries in the set 34 of criteria, then the score may be low. The score, then, may reflect how well the media 32 matches the set 34 of criteria. Moreover, the personal agent 26 may compare the resulting score to a threshold score. If the media's score does not equal of exceed the threshold score, then the personal agent 26 has discretion to store, discard, or ignore the media 32.

Exemplary embodiments maintain user control and privacy. Because the user populates the set 34 of criteria, the user determines what advertisements, movies, programs, music, and other media are of interest to the user. The personal agent 26 thus sifts or filters the media 32 according to the interests of the user. At all times, though, the user completely controls what criteria, e.g., keywords or phrases, describe subject matter of interest to the user. While the user may permit access to the set 34 of criteria, the user may also deter or even restrict access, thus maintaining complete control over how the set 34 of criteria is defined. If the user does not want another party to have access to the set 34 of criteria, the user may configure the personal agent 26 for complete privacy. The user, however, may permit advertisers and service providers to access the set 34 of criteria, thus revealing topics of interest to the user. Moreover, exemplary embodiments do not store personal/private information. Because exemplary embodiments only match keywords and other criteria to media, exemplary embodiments need not collect and analyze social security information, address information, or even anonymous personal or household information. Exemplary embodiments, then, need not disclose personal, private, or sensitive information.

The reader is assumed to be generally familiar with targeted media. If, however, the reader desires more information, the reader is invited to consult the following sources, with each incorporated herein by reference in its entirety: U.S. Pat. No. 5,652,615 to Bryant et al. (Jul. 29, 1997); U.S. Pat. No. 5,774,170 to Hite et al. (Jun. 30, 1998); U.S. Pat. No. 6,006,257 to Slezak (Dec. 21, 1999); U.S. Pat. No. 6,009,409 to Adler et al. (Dec. 28, 1999); U.S. Pat. No. 6,345,293 to Chaddha (Feb. 5, 2002); U.S. Pat. No. 6,446,261 to Rosser (Sep. 3, 2002); U.S. Pat. No. 6,698,020 to Zigmond et al. (Feb. 24, 2004); U.S. Pat. No. 6,771,644 to Brassil et al. (Aug. 3, 2004); Published U.S. Patent Application 2003/0139134 to Bailey et al. (Jul. 24, 2003); Published U.S. Patent Application 2004/0031058 to Reisman (Feb. 12, 2004); Published U.S. Patent Application 2004/0131357 to Farmer et al. (Jul. 8, 2004); Published U.S. Patent Application 2004/0210944 to Brassil et al. (Oct. 21, 2004); and Published U.S. Patent Application 2006/0029093 to Van Rossum (Feb. 9, 2006).

The user's communications device 20 and the media server 22 are only simply illustrated. Because the architecture and operating principles of computers, communications devices, and other processor-controlled devices are well known, details of the hardware and software components of the user's communications device 20 and the media server 22 are not further shown and described. If, however, the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ edition 2005); and DAVID A. PATTERSON & JOHN L. HENNESSY, COMPUTER ORGANIZATION AND DESIGN: THE HARDWARE/SOFTWARE INTERFACE ($3^{rd}$ Edition 2004).

Figure 2:
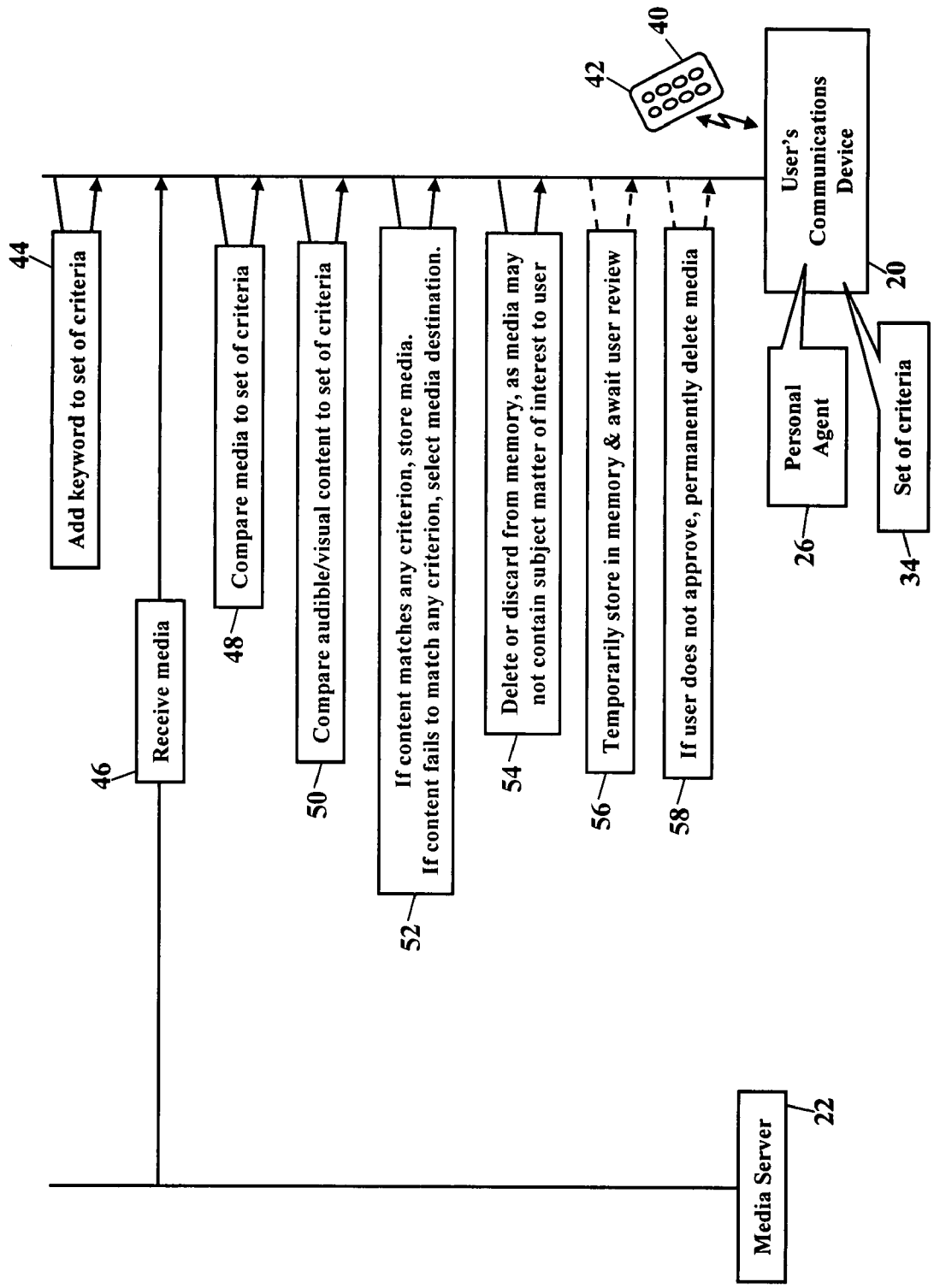
FIG. 2 is a schematic illustrating a process for targeting media, according to more exemplary embodiments.

FIG. 2 is a schematic illustrating a process for targeting media, according to more exemplary embodiments. Here the user utilizes a user interface 40 to populate the set 34 of criteria. The user enters words and/or phrases of interest to the user using the user interface 40. The user interface 40 is illustrated as a remote control 42, yet the user interface 40 may be a control panel, keypad, keyboard, display, or any other means for receiving spoken or tactile inputs. The processor (shown as reference numeral 30 in FIG. 1) receives an input via the user interface 40, and the input instructs the processor to add the keyword, phrase, or property to the set 34 of criteria (Step 44). The user's communications device 20 also receives the media stream or file (e.g., movie, music, advertisements, and/or images) (Step 46). The personal agent 26 compares the media to the set 34 of criteria (Step 48). The personal agent 26 compares the textual and/or visual content of the media to the set 34 of user-defined criteria (Step 50). If the textual and/or visual content contains any criterion in the set 34 of criteria, then the media is stored in memory; otherwise, if the textual and/or visual content fails to contain any criterion, then the personal agent 26 may select a destination (Step 52). The media, for example, may be deleted or discarded from memory, as the media may not contain subject matter of interest to the user (Step 54). The media, however, may be temporarily stored in memory to await user review (Step 56). If the user does not review and/or approve the media within a predetermined time frame (e.g., seven days), then the media may be permanently deleted from memory (Step 58).

The personal agent 26 compares textual and/or visual content of the media. The personal agent 26, for example, may compare the set 34 of criteria to metadata associated with the media 32. The personal agent 26 may additionally or alternatively compare the set 34 of criteria to a textual transcript of the media 32. The transcript may describe dialogue or a scene within the media 32. The personal agent 26 may additionally or alternatively use audible word recognition techniques to analyze an audio soundtrack of the media 32. The audio soundtrack is analyzed for recognized words, and those recognized words are compared to the set 34 of criteria. The personal agent 26 may additionally or alternatively compare the pitch, emphasis, and rhythm of the soundtrack to known characteristics of a criterion. The personal agent 26 may additionally or alternatively use pattern and color recognition techniques to detect objects of interest to the user.

Descriptive text may be provided by a media source. The descriptive text, for example, may be created and provided by the media server 22. The media server 22 may analyze or process the media 32 and provide a textual description of the media 32. The media server 22 then provides this textual description to the personal agent 26. The media server 22 could provide this textual description a content creator fails to provide the descriptive text.

Exemplary embodiments thus target media to the user. Because the user populates the set 34 of criteria, the user may define the criteria, such as words and/or phrases, that are of interest to the user. The more descriptive the criteria, the more relevant the media 32 is to the user. Very descriptive criteria, however, also may greatly filter media, thus limiting the amount of media stored for retrieval. Returning to the "boating" example from above, if the user populates the set 34 of criteria with "jib," "ballast," "batten," or "hull," few media are likely to contain such narrow terms. As the user gains experience with the personal agent 26, however, the user may tailor the set 34 of criteria to balance the user's interests with the user's desired viewing time and inventory or catalog of stored media.

Figure 3:
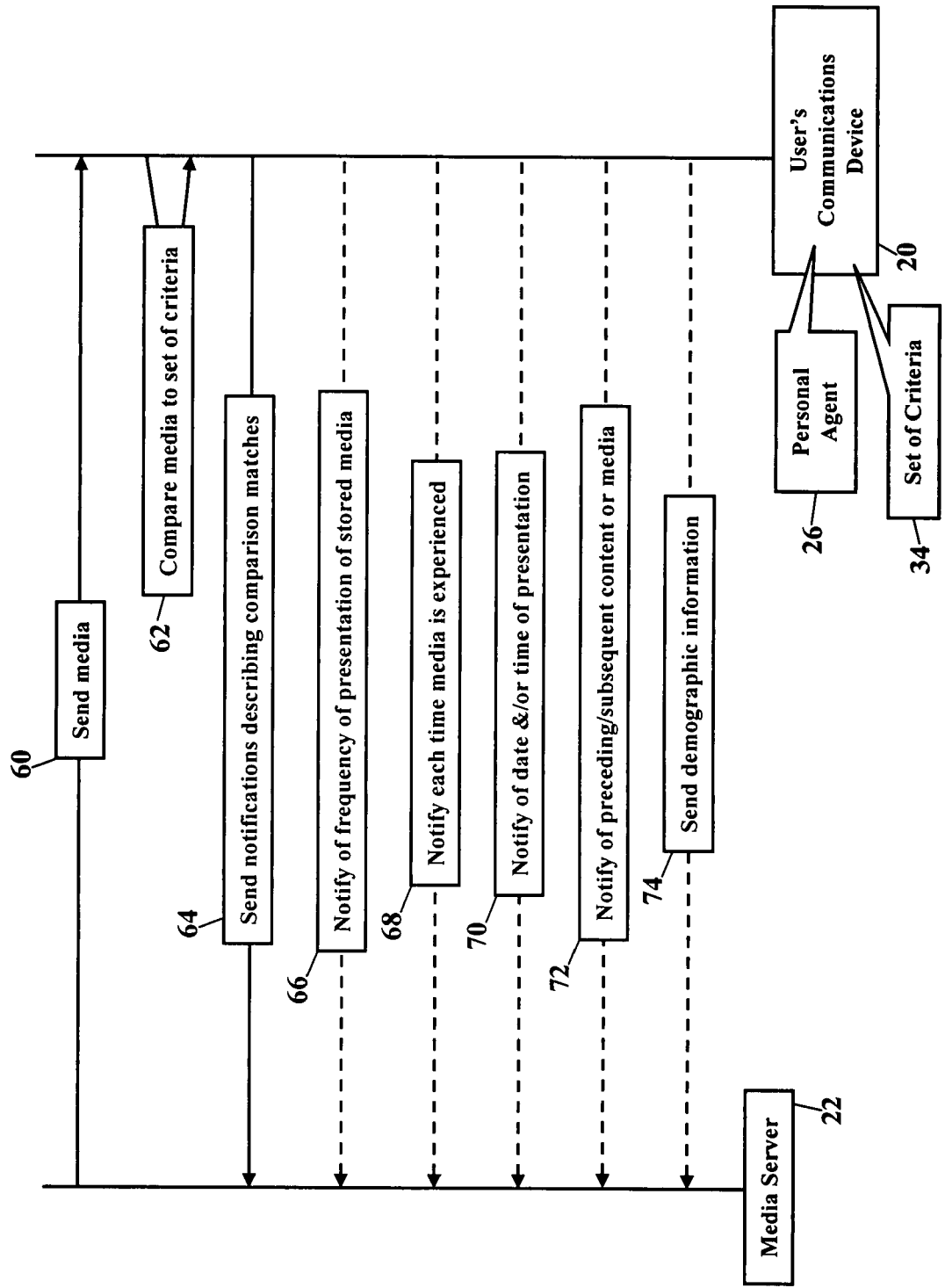
FIG. 3 is a schematic illustrating another process for targeting media, according to even more exemplary embodiments.

FIG. 3 is a schematic illustrating another process for targeting media, according to even more exemplary embodiments. The media server 22 sends the media to the user's communications device 20 (Step 60). The personal agent 26 compares the media to the set 34 of criteria (Step 62). The personal agent 26 sends notifications to the media server 22 describing comparison matches (Step 64). That is, the media server 22 is notified when the media matches one or more keywords in the user's set of criteria. The media thus contains subject matter of interest to the user. The personal agent 26, however, may also provide additional notifications or information. The media server 22, for example, may be notified of a frequency of presentation of the stored media (Step 66). The personal agent 26 may inform the media server 22 of each time the user retrieves and watches, listens to, or otherwise experiences the media (Step 68). The personal agent 26 may inform the media server 22 of a date and/or time of presentation of the media (Step 70). The media server 22 may be notified of preceding content/media that precedes presentation of the media and/or of subsequent content/media that follows presentation of the media (Step 72). The personal agent 26 may also collect and send demographic information describing the user (Step 74).

Figure 4:
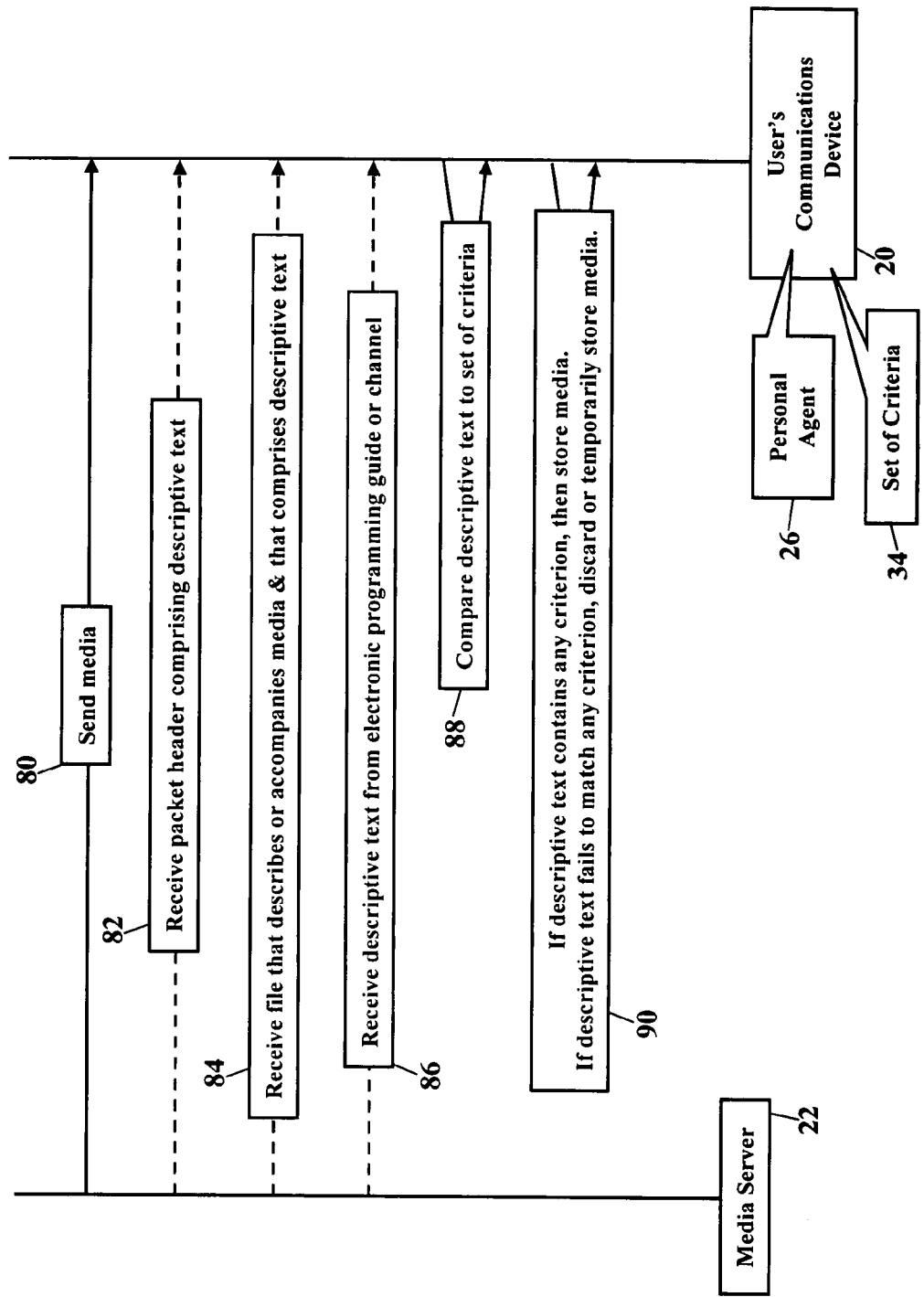
FIG. 4 is a schematic illustrating yet another process for targeting media, according to still more exemplary embodiments.

FIG. 4 is a schematic illustrating yet another process for targeting media, according to still more exemplary embodiments. The media server 22 sends the media to the user's communications device 20 (Step 80). Here the media is associated with descriptive text that describes the media. The descriptive text is a set of words or phrases that describe the visual and/or audible content of the media. The descriptive text, for example, may simply be a listing of words or phrases describing the subject matter of the media. The descriptive text, however, may also include a textual description of the media, the plot, actors/actresses, director, scenes, and/or any other descriptive information. The descriptive text may be contained within the media, or the descriptive text may separately accompany the media. The user's communications device 20, for example, may receive one or more packet headers comprising the descriptive text (Step 82). The user's communications device 20 may additionally or alternatively receive a file that describes or accompanies the media and that comprises the descriptive text (Step 84). The descriptive text may also be received from an electronic programming guide or channel (Step 86). However the descriptive text is received, the descriptive text is compared to the set of criteria (Step 88). If the descriptive text contains any criterion, then the media is stored in memory; otherwise, if the descriptive text fails to contain any criterion, then the media may be discarded or temporarily stored (Step 90). The media that is stored may be targeted to the user's communications device.

Figure 5:
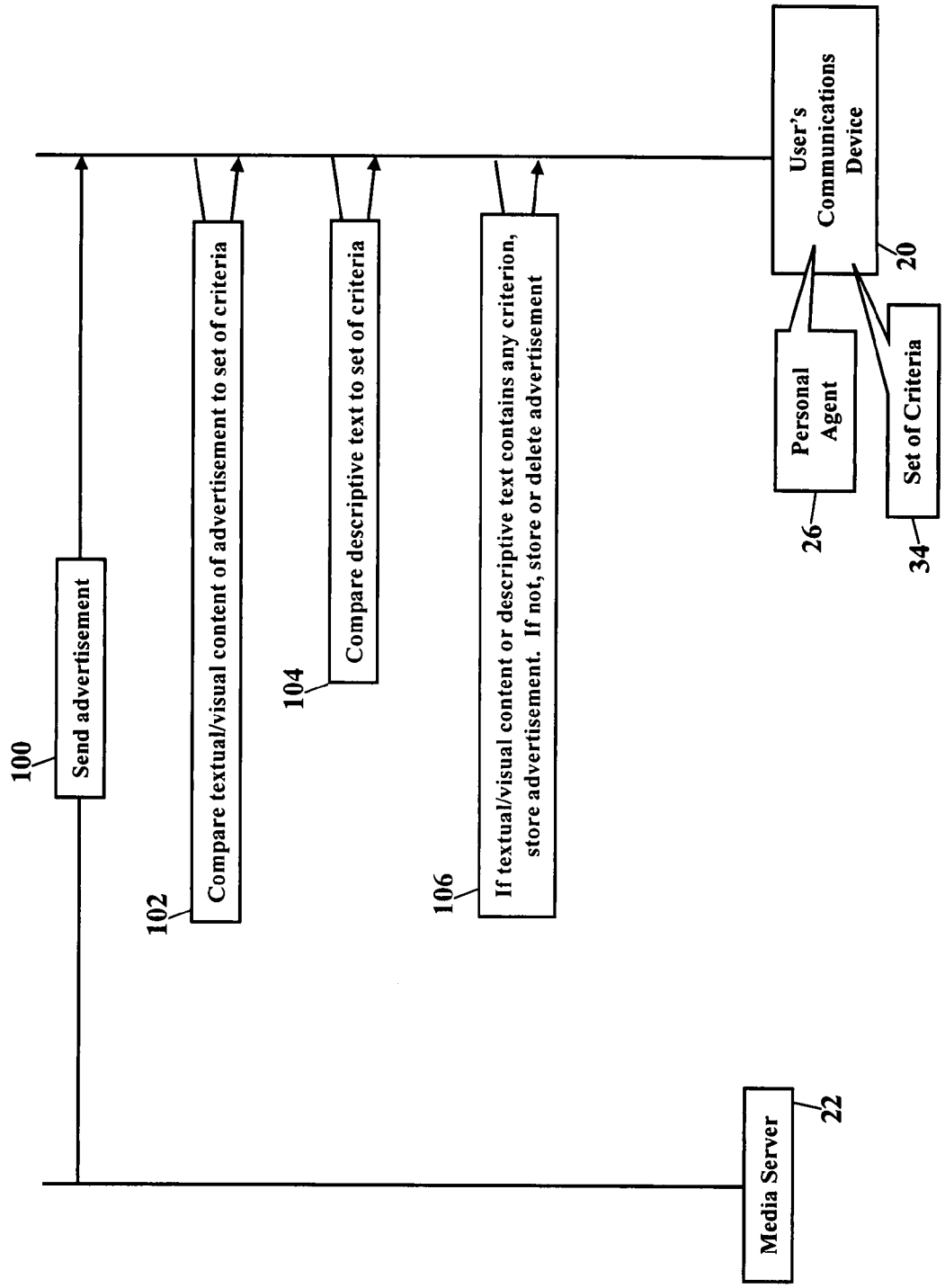
FIGS. 5 and 6 are schematics illustrating yet another process for targeting media, according to still more exemplary embodiments.
Figure 6:
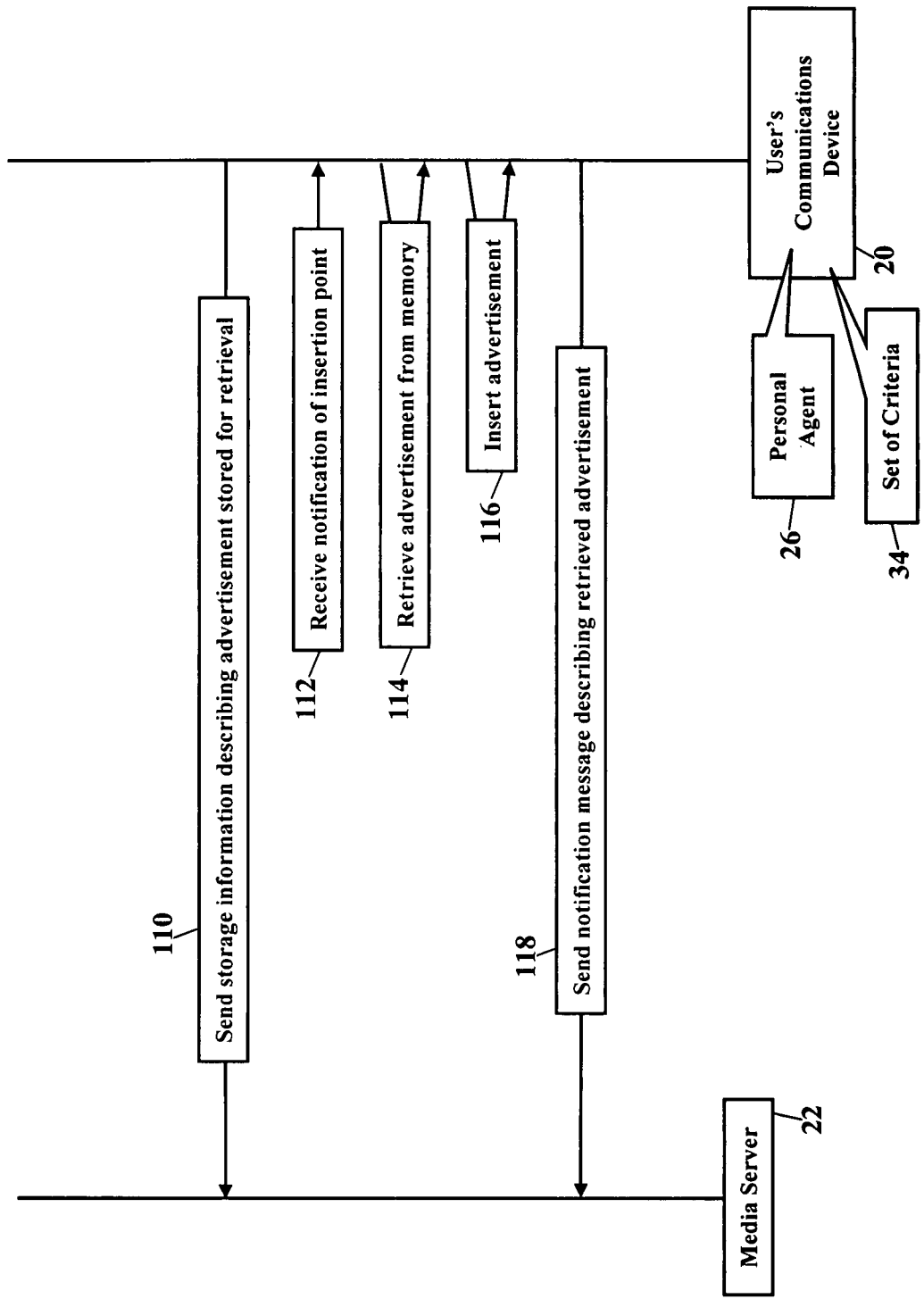

FIGS. 5 and 6 are schematics illustrating yet another process for targeting media, according to still more exemplary embodiments. Here the media server 22 sends an advertisement to the user's communications device 20 (Step 100). That is, the media is an advertising stream or file, and the personal agent 26 determines whether the advertisement appeals to the user. The personal agent 26 compares the textual and/or visual content of the advertisement to the set 34 of user-defined criteria (Step 102). The personal agent 26 may additionally or alternatively compare descriptive text to the set 34 of criteria (Step 104). If the textual content, the visual content, and/or the descriptive text contains any criterion in the set 34 of criteria, then the advertisement is stored in memory (Step 106). The advertisement may thus contain subject matter of interest to the user. If the advertisement fails to contain any criterion, then the personal agent 26 has discretion to store or delete the advertisement from memory (Step 108). FIG. 5, then, illustrates how the user may personally determine what advertisements appeal to the interests of the user. Those advertisements that do not appeal to the user may be discarded or ignored, thus more efficiently utilizing the user's precious viewing time.

The process continues with FIG. 6. When an advertisement is stored, the advertisement may contain subject matter that appeals to the user. The personal agent 26, then, may send storage information describing what advertisements are stored for retrieval by the user's communications device (Step 110). The storage information helps advertisers, marketers, and/or product/service providers to identify the effectiveness of the advertisement. When the user's communications device 20 is notified of an advertisement insertion point (Step 112), the personal agent 26 retrieves a stored advertisement from memory (Step 114). That stored advertisement is inserted into the insertion point (Step 116). The personal agent 26 then sends a notification message describing the retrieved advertisement (Step 118). As FIG. 3 illustrated, the personal agent 26 may notify the media server 22 of a frequency of presentation, preceding and/or subsequent media, or demographic information (e.g., income and gender) describing the user and/or the user's household.

Figure 7:
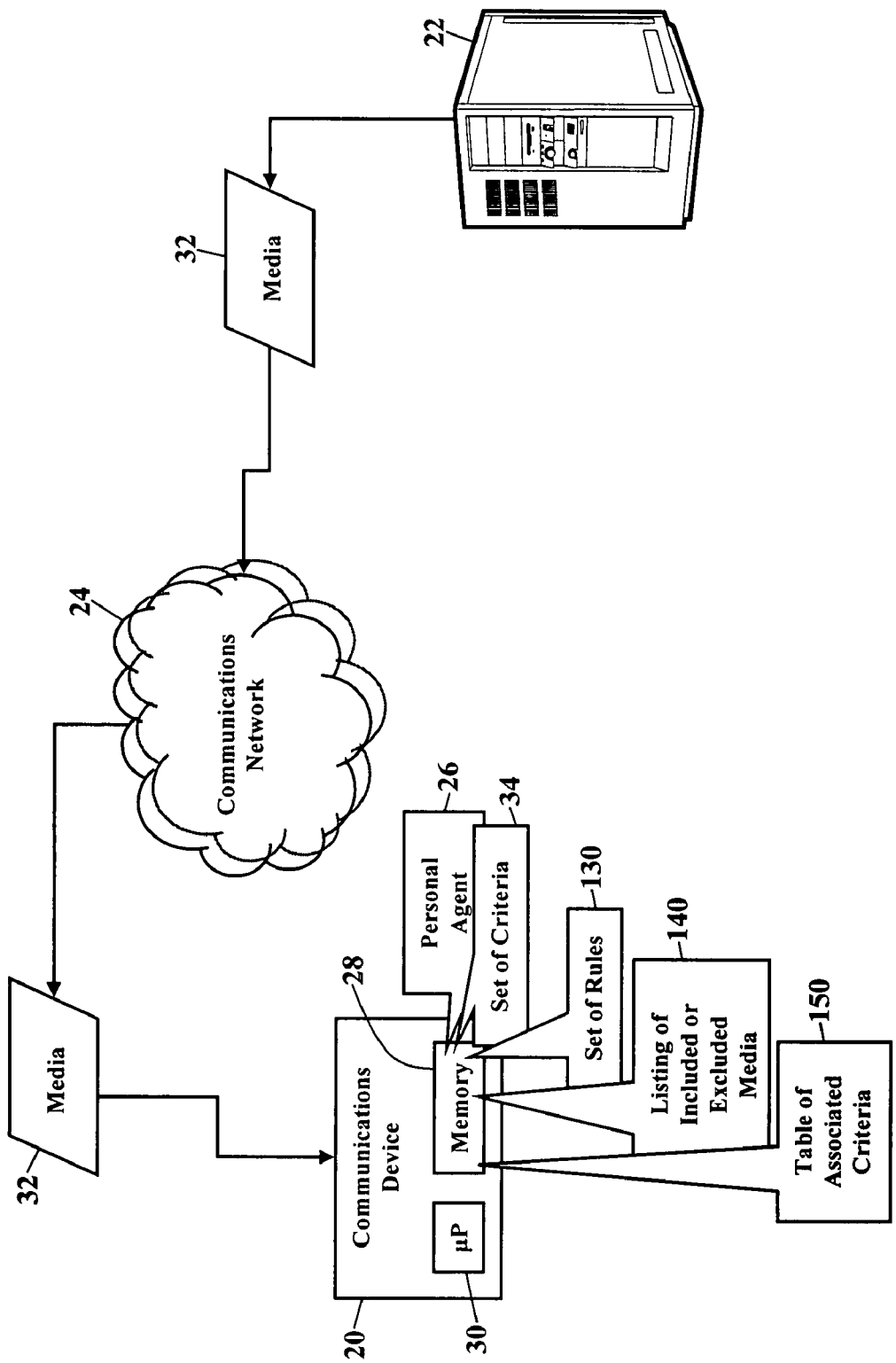
FIG. 7 is a schematic illustrating additional exemplary embodiments.

FIG. 7 is a schematic illustrating additional exemplary embodiments. The personal agent 26 may access a set 130 of rules stored in the memory 28. The set 130 of rules comprises one or more exclusions, conditions, and other logical rules for comparing the media 32 to the set 34 of criteria. The user, for example, may determine that a single keyword match results in too much media. That is, if media (such as an advertisement) only contains a single keyword match, the user may find that too many irrelevant advertisements are being stored to the user's communications device 20. The user, then, may configure the set 130 of rules to require multiple keyword matches before the media 32 is stored to the memory 28. The user, for example, may require that the media contain five (5) different keyword matches to ensure the media 32 is relevant to the user's interests. The set 130 of rules may also contain keyword combinations that are required before the media 32 is stored to the memory 28. Again, some combinations of keywords may ensure that the media 32 is relevant to the user's interests. The set 130 of rules, similarly, may contain word or phrasing combinations that automatically exclude the media 32 as not being relevant to the user's interests. The user, in short, may configure the set 130 of rules to further ensure that the media 32 is relevant to the user's interests.

The personal agent 26 may also access a listing 140 of included or excluded media. The user may wish to receive and store some media, regardless of whether the media 32 matches any criterion in the set 34 of criteria. Similarly, even though some media may contain one or more keywords in the set 34 of criteria, the media may still be irrelevant to the user's interests. If, for example, the user is interested in "automobiles," the user may not be interested in a laundry soap commercial that shows or mentions "car." Before the personal agent 26 accepts the media 32, then, the personal agent 26 may first compare the media 32 to the listing 140 of included or excluded media. The listing 140 of included or excluded media comprises a listing of titles, actors, actresses, directors, or any other information that the user wishes to include or exclude. If any information associated with the media 32 matches an entry in the listing 140 of included or excluded media, then the personal agent 26 may store, ignore, or delete the media 32. The listing 140 of included or excluded media further helps ensure that the user's limited viewing time is wisely consumed.

The personal agent 26 may also populate the set 34 of criteria. The personal agent 26 may include intelligent logic and programming statements that autonomously identify criteria of interest (such as keywords) to the user. As media is successfully compared to the set 34 of criteria, the personal agent 26 may add related or additional criteria to the set 34 of criteria. The personal agent 26 may query a table 150 of associated criteria. The table 150 of associated criteria contains word and phrase associations that may lead to a richer definition of relevant or interesting subject matter. Suppose, for example, that the user has an interest in "cars." The table 150 of associated criteria may contain words, phrases, and other terms that appeal to similar subject matter interests. The table 150 of associated criteria, for example, may relate "cars" to "trucks," "racing," "tires," and even "motor oil." The table 150 of associated criteria may even relate "cars" to related phrases, such as "all wheel drive," "fuel injection," and "anti-lock brakes." The personal agent 26 may then query the table 150 of associated criteria for terms, keywords, and phrases that are associated with "cars." The personal agent 26 may then add those query results to the set 34 of criteria. So, even though the user only populated the set 34 of criteria with "cars," the personal agent 26 may autonomously add additional criteria to enrich the user's subject matter definitions. The personal agent 26 also allows the user to access and to review the table 150 of associated criteria. The user may thus edit the table 150 to add, or remove, any undesired terms.

Figure 8:
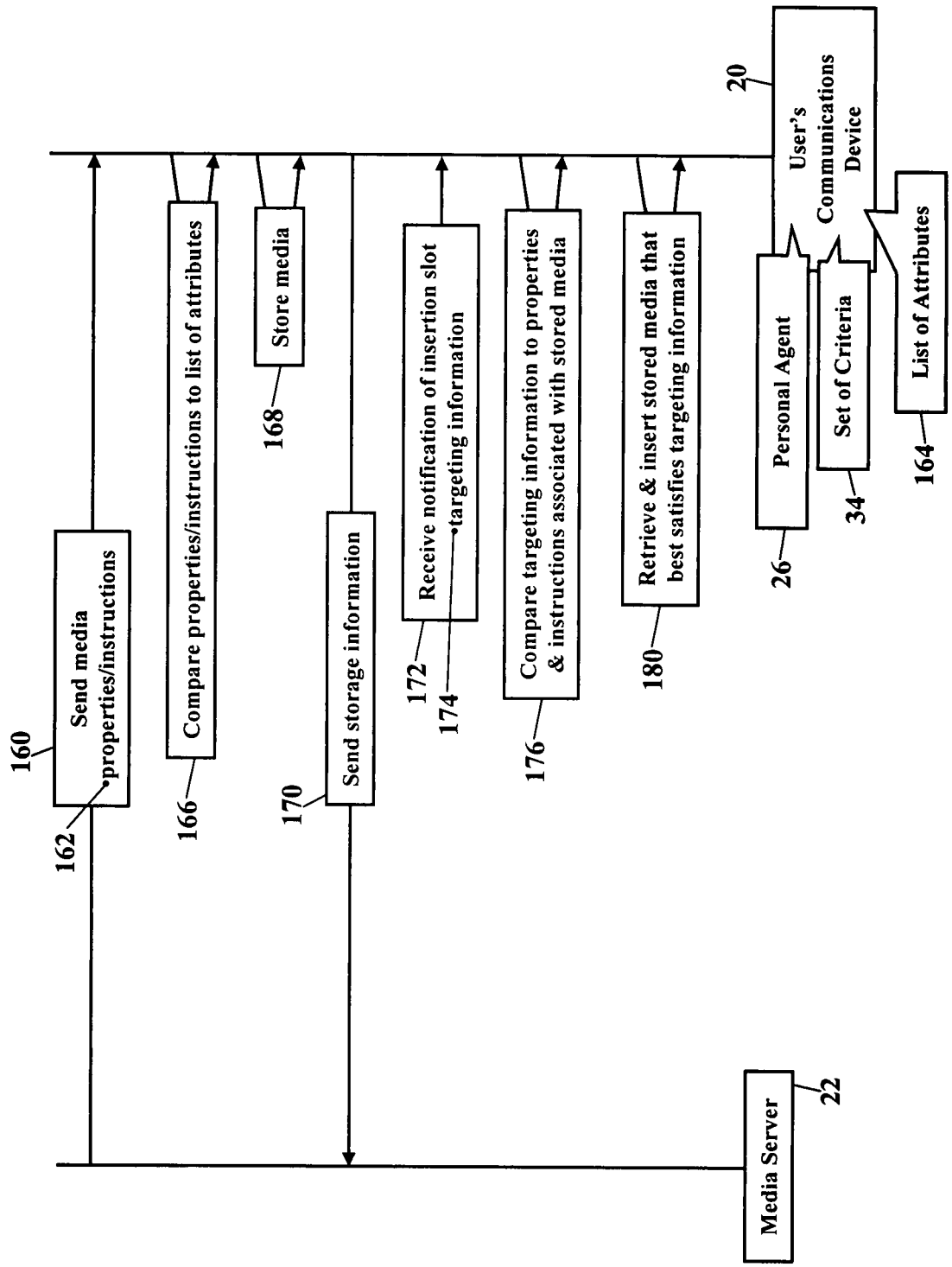
FIG. 8 is a schematic illustrating yet another process for targeting media, according to even more exemplary embodiments.

FIG. 8 is a schematic illustrating yet another process for targeting media, according to even more exemplary embodiments. The media server 22 sends the media via a multicast or unicast stream to the user's communications device 20 (Step 160). Here the media is associated with properties and/or instructions 162. These properties and/or instructions 162 may contain information regarding the target audience for whom the media is targeted. An advertisement for a luxury vehicle, for example, may be associated with properties indicating the advertisement is targeted to males and females, aged 40-65 years, and living in an affluent area or ZIP code. These properties and/or instructions 162 may also include information describing when to process the advertisement for audible/visual presentation and/or how many times the advertisement is presented before expiring.

The properties and/or instructions 162 are compared to a list 164 of attributes (Step 166). When the media is received by the user's communications device 20, the personal agent 26 compares the properties and/or instructions 162 to the list 164 of attributes stored in memory 28. The list 164 of attributes demographically describes the user, the user's household, and/or the user's interests. The list 164 of attributes may include the set 34 of criteria, but the list 164 of attributes may additionally include broader and richer targeting descriptions. The list 164 of attributes may describe the user's target preferences for advertising, movies, and other media. The user, for example, may only be interested in media that is targeted to females, aged 35-45, and living in a metropolitan area. The list 164 of attributes may further include media preferences, such as "romantic comedies," "George Clooney," and "classic musicals." The user thus accesses and populates the list 164 of attributes with media preferences. The list 164 of attributes may include the user's age, income, ZIP code, and other demographic information. The personal agent 26 may even autonomously populate the list 164 of attributes, based on the user's historical media selections. The user, of course, may include more personally identifiable information, and the user may configure the personal agent to reveal none, some, or all of the list 164 of attributes.

If the media favorably compares, the media is stored (Step 168). The properties and/or instructions 162 are compared to the list 164 of attributes. The personal agent 26 may consult the set 130 of rules (shown in FIG. 7) to determine how well the media must compare to the list 164 of attributes. The personal agent 26 may also access the table 140 of included or excluded media (shown in FIG. 7) to determine whether the user wishes to exclude the media. If the properties and/or instructions 162 still match, or favorably compare, to the list 164 of attributes, then the personal agent 26 stores the media in memory. The personal agent 26 may also send storage information describing what media is stored for retrieval by the user's communications device (Step 170).

The media is then retrieved for presentation. The user's communications device 22 is notified of a media insertion point (Step 172). The notification may also include targeting information 174 describing what type of media should be inserted into the insertion point. The information may describe any type of media that is to be inserted into the insertion point (such as a movie, music, or advertisement). The personal agent 26 compares the targeting information 174 to the properties and/or instructions 162 associated with the stored media (Step 176). The personal agent 26 thus retrieves and inserts the stored media that best satisfies the targeting information 174 (Step 178).

The set 34 of criteria may be populated via a user interview. The user may access the set 34 of criteria via the user interface 40 and enter keywords and phrases describing desired subject matter. The personal agent 26, however, may conduct an automated interview and, based on the user's interview responses, populate the set 34 of criteria. The personal agent 26, for example, may instruct the processor 30 to visually display or audibly present a menu of questions. As the user enters responses to the questions, the personal agent 26 analyzes those responses. The personal agent 26 may query the user for likes and dislikes and appealing media titles, genres, actors, actresses, and other indicators of appealing subject matter. The personal agent 26 may then populate the set 32 of criteria with keywords and phrases that help describe the appealing subject matter. The personal agent 26 thus builds the set 34 of criteria based on answers to questions presented to the user on the communications device 22.

Figure 9:
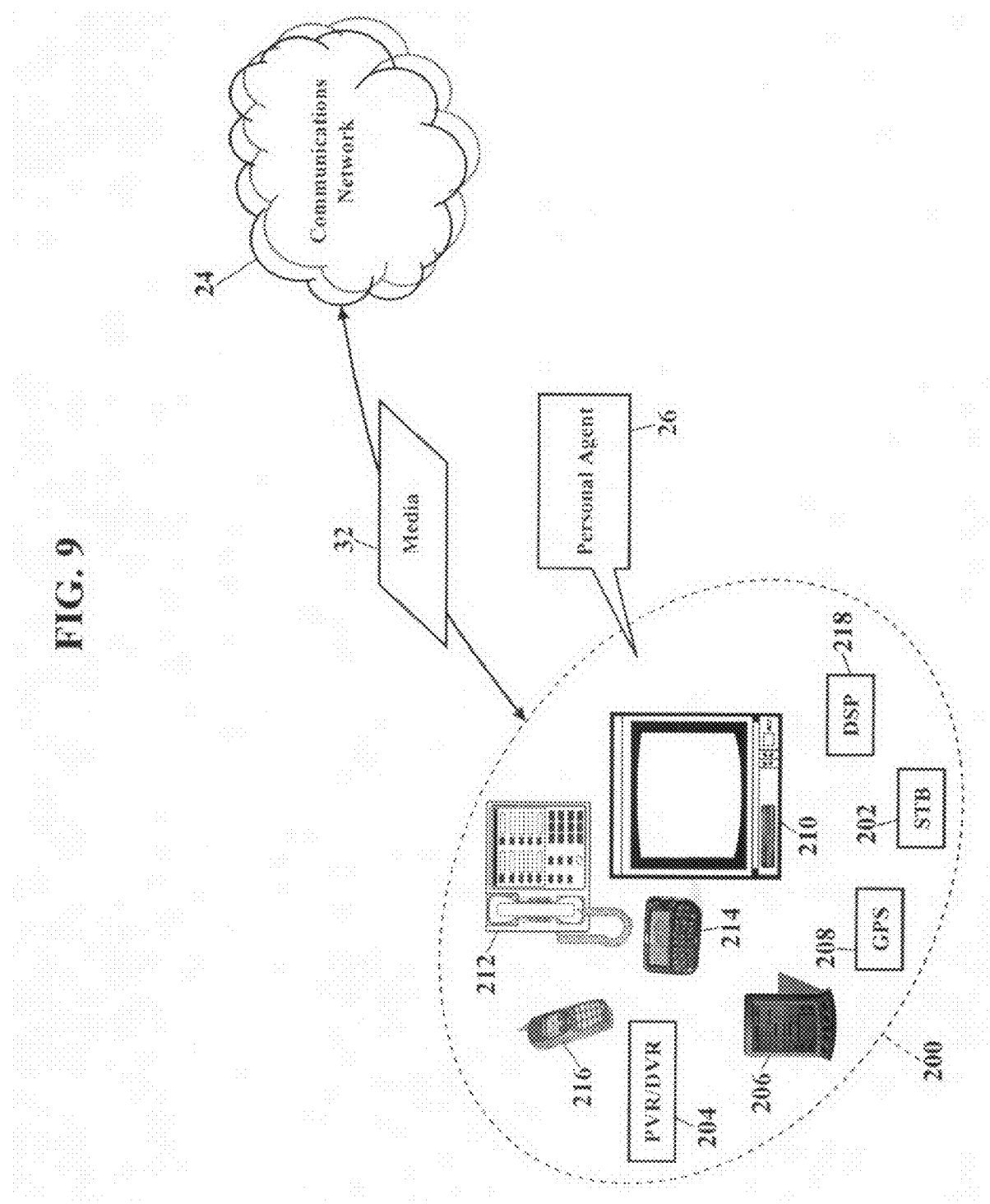
FIG. 9 is a schematic illustrating additional communications devices in which exemplary embodiments may operate.

FIG. 9 depicts other possible operating environments, according to more exemplary embodiments. FIG. 9 illustrates that the personal agent 26 may alternatively or additionally operate within various other communications devices 200. FIG. 9, for example, illustrates that the personal agent 26 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

The exemplary embodiments may be applied regardless of networking environment. The user's communications device 20, and the media server 22, may operate using wired or wireless principles. The communications network 24 may be a cable network operating in the radio-frequency domain and/or the Internet Protocol (IP) domain. The communications network 24 may have POTS components and/or features. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network or communications device, regardless of physical componentry, physical configuration, or communications standard(s).

The personal agent 26 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the personal agent 26 to be easily disseminated. A computer program product comprises the personal agent 26 stored on the computer-readable medium. The personal agent 26 comprises computer-readable instructions/code for targeting media, as hereinabove explained.

Figure 10:
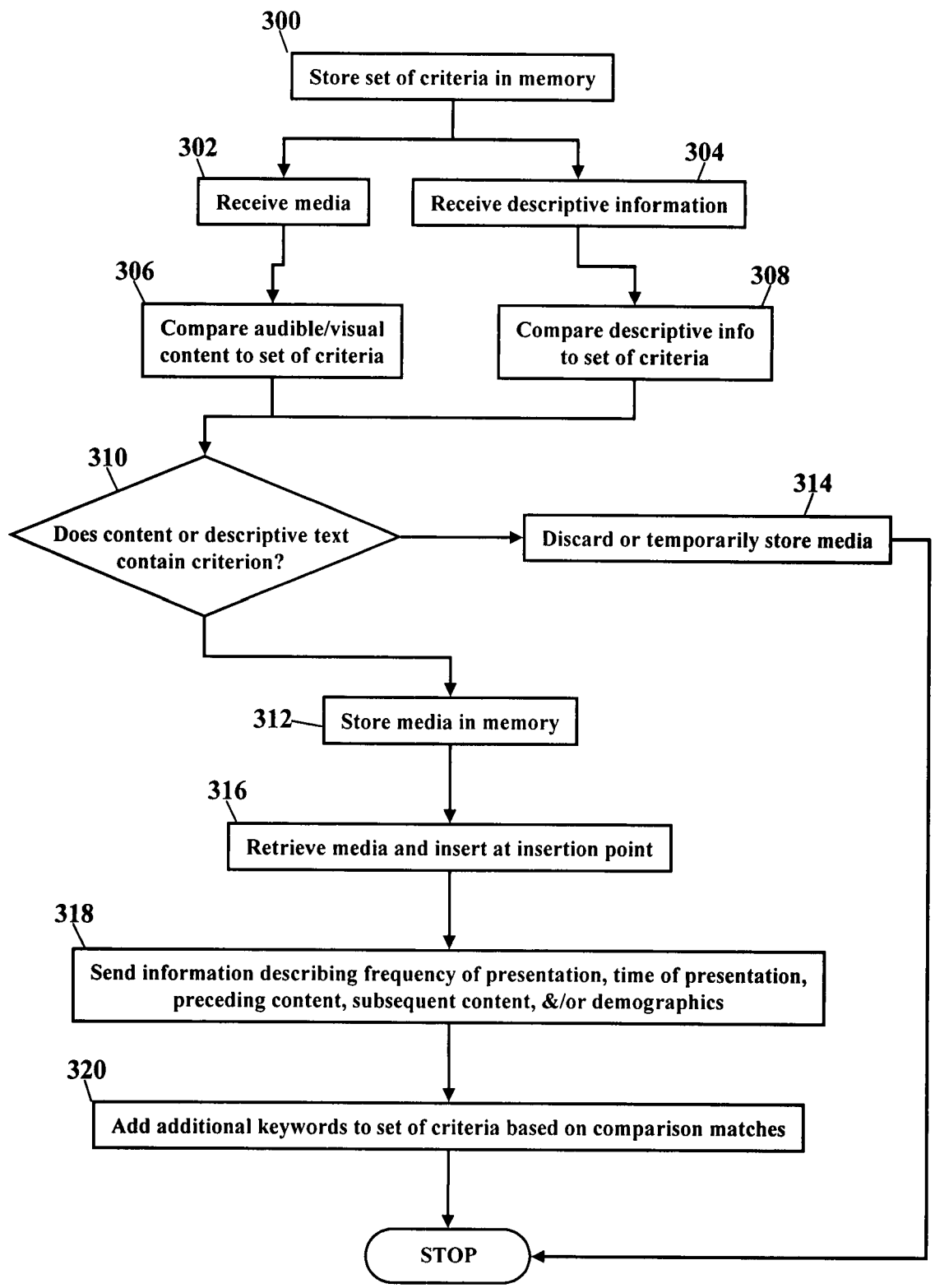
FIGS. 10 and 11 are flowcharts illustrating methods for targeting media according to exemplary embodiments.

FIG. 10 is a flowchart illustrating a method for targeting media. A set of criteria is stored in memory (Block 300). Media is received (Block 302) and/or descriptive text is received that describes the media (Block 304). The audible/visual content of the media is compared to the set of criteria (Block 306). The descriptive text is compared to the set of criteria (Block 308). If the content of the media or the descriptive text contains any criterion (Block 310), then the media is stored in memory (Block 312). If the content of the media or the descriptive text fails to contain any criterion (Block 310), then the media is discarded (Block 314). The stored media is retrieved from memory and inserted into an insertion point (Block 316). Information is sent that describes at least one of i) a frequency of presentation of the stored media, ii) a time of presentation of the stored media, iii) preceding content that precedes presentation of the stored media, iv) subsequent content that follows presentation of the stored media, and vi) demographic information describing the user (Block 318). Additional keywords may be added to the set of keywords based on comparison matches (Block 320).

Figure 11:
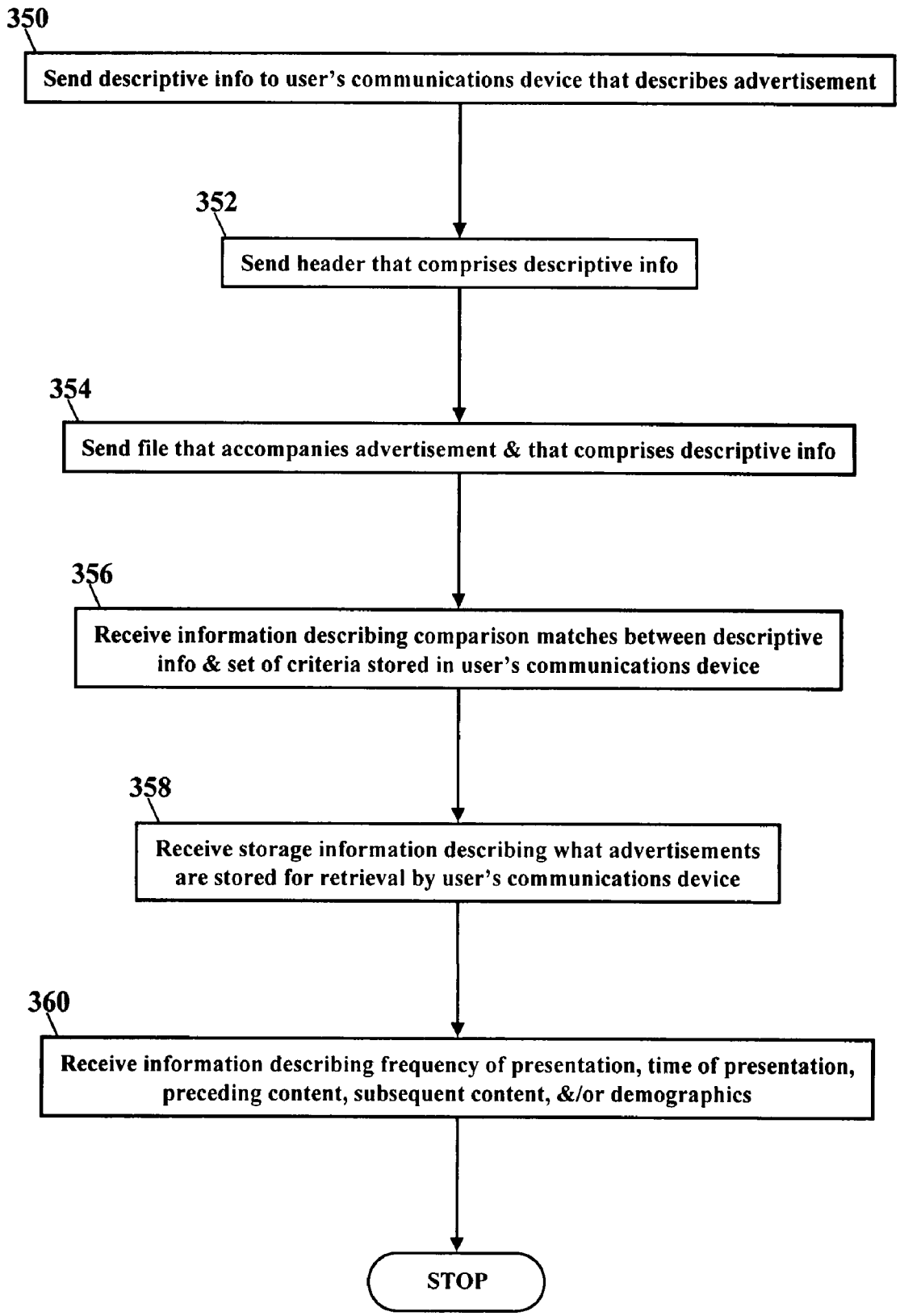

FIG. 11 is another flowchart illustrating another method for targeting media. Descriptive text is sent to a user's communications device that describes an advertisement (Block 350). A header may be sent that comprises the descriptive text (Block 352). A file may also be sent that accompanies the advertisement and that comprises the descriptive text (Block 354). Information is received that describes comparison matches between the descriptive text and a set of user-defined criteria that are stored in memory of a user's communications device (Block 356). Storage information may be received that describes what advertisements are stored for retrieval by the user's communications device (Block 358). Information may also be received that describes at least one of i) a frequency of presentation of the advertisement, ii) a time of presentation of the advertisement, iii) preceding content that precedes presentation of the advertisement, iv) subsequent content that follows presentation of the advertisement, and vi) demographic information describing the user (Block 360).

The personal agent 26 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for targeting media to a communications device of a user, comprising:

receiving descriptive information that describes media;

comparing the descriptive information to stored user-defined criteria, the user-defined criteria comprising keywords input by a user, wherein comparing the descriptive information to the user-defined criteria comprises:

determining whether keywords of the user-defined criteria match the descriptive information of the media, wherein the descriptive information of the media is required to contain five different keyword matches to the keywords input by the user; and determining whether specific combinations of the user-defined criteria match the descriptive information of the media;

comparing the descriptive information to the user-defined criteria further comprises: responsive to the match being determined from comparing the descriptive information of the media to the user-defined criteria, determining whether the match should be excluded based on exclusion rules for the media;

storing the media to memory of a communications device, responsive to determining the match of descriptive information of the media and responsive to the match not being excluded; and sending information describing: a frequency of presentation of the stored media, a time of presentation of the stored media, a preceding content that precedes presentation of the stored media, and a subsequent content that follows presentation of the stored media.

2. A method according to claim 1, wherein the user-defined criteria being input by the user further comprises: graphical symbols, visual symbols, pictures, and audio content.

3. A method according to claim 1, wherein receiving the descriptive information comprises receiving at least one of i) a header comprising the descriptive information and ii) a file that accompanies the media and that comprises the descriptive information.

4. A method according to claim 1, further comprising sending information describing demographic information describing the user.

5. A method according to claim 1, wherein media comprises: movies, music, advertisements, and images.

6. A method for targeting media to a communications device of a user, comprising:
   receiving descriptive information that describes media at a user's communications device;
   determining comparison matches between the descriptive information and user-defined criteria that are stored in memory of the user's communications device, wherein the descriptive information of the media is required to contain five different keyword matches to keywords input by the user;
   scoring the comparison matches based on a correlation between the descriptive information and the user-defined criteria;
   storing the media when the score of the comparison matches is above a threshold; and
   sending information describing: a frequency of presentation of the stored media, a time of presentation of the stored media, a preceding content that precedes presentation of the stored media, and a subsequent content that follows presentation of the stored media.

7. A method according to claim 6, wherein receiving the descriptive information comprises receiving at least one of i) a header comprising the descriptive information and ii) a file that accompanies the media and that comprises the descriptive information.

8. A method according to claim 6, further comprising transmitting information describing demographic information describing the user.

9. A method according to claim 6, flirt her comprising transmitting storage information describing what media are stored for retrieval by the user's communications device, wherein the transmitted storage information is adapted to be feedback to a media server providing the descriptive information for media.

10. A device for targeting media, comprising:
   memory for storing a program for targeting media for storage; and
   a processor, functionally coupled to the memory, the processor being responsive to computer-executable instructions contained in the program and operative to:
      receive descriptive information that describes media;
      compare the descriptive information to a stored set of user-defined criteria, the user-defined criteria comprising keywords input by a user, wherein comparing the descriptive information to the user-defined criteria comprises:
         determining whether keywords of the user-defined criteria match the descriptive information of the media, wherein the descriptive information of the media is required to contain five different keyword matches to the keywords input by the user; and
         determining whether specific combinations of the user-defined criteria match the descriptive information of the media;
      comparing the descriptive information to the user-defined criteria further comprises:
         responsive to the match being determined from comparing the descriptive information of the media to the user-defined criteria, determining whether the match should be excluded based on exclusion rules; and
         storing the media to the memory of device, responsive to determining the match of descriptive information of the media and responsive to the match not being excluded; and
      sending information describing: a frequency of presentation of the stored media, a time of presentation of the stored media, a preceding content that precedes presentation of the stored media, and a subsequent content that follows presentation of the stored media.

11. A device according to claim 10, wherein the processor receives at least one of i) a header comprising the descriptive information and ii) a file that accompanies the media and that comprises the descriptive information.

12. A device according to claim 10, wherein the processor retrieves the stored media and inserts the stored media into an insertion point.

13. A device according to claim 10, wherein the processor sends information describing demographic information describing the user.

14. A device according to claim 10, wherein media comprises: movies, music, advertisements, and images.

15. A device for targeting media, comprising:
   memory for storing a program for targeting media for storage; and
   a processor, functionally coupled to the memory, the processor being responsive to computer-executable instructions contained in the program and operative to:
      receive descriptive information that describes media at a user's communications device;
      determine comparison matches between the descriptive information and user-defined criteria that are stored in memory of the user's communications device, the user-defined criteria comprising keywords input by a user;
      score the comparison matches based on a correlation between the descriptive information and the user-defined criteria, wherein the descriptive information of the media is required to contain five different keyword matches to the keywords input by the user;
      store the media when the score of the comparison matches is above a threshold; and
      send information describing: a frequency of presentation of the stored media, a time of presentation of the stored media, a preceding content that precedes presentation of the stored media, and a subsequent content that follows presentation of the stored media.

16. A device according to claim 15, wherein the processor sends at least one of i) a header comprising a descriptive text and ii) a file that accompanies an advertisement and that comprises the descriptive text.

17. A device according to claim 15, wherein the processor receives information describing demographic information describing the user.

18. A device according to claim 15, wherein the processor transmits storage information describing what advertisements are stored for retrieval by the user's communications device, wherein the transmitted storage information is adapted to be feedback to a media server providing the descriptive information for media.

19. A computer program product, tangibly embodied on a computer readable medium, the computer program product including instructions for causing a computer to execute a method for targeting media for storage on a communications device, comprising:
   receiving descriptive information that describes media;
   comparing the descriptive information to stored user-defined criteria, wherein comparing the descriptive information to the user-defined criteria comprises:
      determining whether keywords of the user-defined criteria match the descriptive information of the media; and
      determining whether specific combinations of the user-defined criteria match the descriptive information of the media;
   comparing the descriptive information to the user-defined criteria further comprises: responsive to the match being determined from comparing the descriptive information of the media to the user-defined criteria, determining whether the match should be excluded based on exclusion rules for the media;
   storing the media to memory of a communications device, responsive to determining the match of descriptive information of the media and responsive to the match not being excluded; and
   sending information describing: a frequency of presentation of the stored media, a time of presentation of the stored media, a preceding content that precedes presentation of the stored media, and a subsequent content that follows presentation of the stored media.

20. A computer program product tangibly embodied on a computer readable medium, the computer program product including instructions for causing a computer to execute a method for targeting media for storage on a communications device, comprising:
   receiving descriptive information that describes media at a user's communications device;
   determining comparison matches between the descriptive information and user-defined criteria that are stored in memory of the user's communications device;
   scoring the comparison matches based on a correlation between the descriptive information and the user-defined criteria;
   storing the media when the score of the comparison matches is above a threshold; and
   sending information describing: a frequency of presentation of the stored media, a time of presentation of the stored media, a preceding content that precedes presentation of the stored media, and a subsequent content that follows presentation of the stored media.

\* \* \* \* \*